(12) United States Patent
Mansour

(10) Patent No.: US 8,050,236 B1
(45) Date of Patent: Nov. 1, 2011

(54) SYSTEM AND METHOD FOR TRANSMITTING INFORMATION VIA HYBRID CDM/OFDM MODES IN HSDPA AND IP WIRELESS

(75) Inventor: Nagi A. Mansour, Arlington, VA (US)

(73) Assignee: Nextel Communications Inc., Reston, VA (US)

( * ) Notice: Subject to any disclaimer, the term of this patent is extended or adjusted under 35 U.S.C. 154(b) by 1126 days.

(21) Appl. No.: 11/486,771

(22) Filed: Jul. 14, 2006

(51) Int. Cl.
*H04B 7/216* (2006.01)
*H04J 1/00* (2006.01)
*H04J 3/00* (2006.01)
*H04B 7/208* (2006.01)

(52) U.S. Cl. ........ 370/335; 370/342; 370/343; 370/344; 370/345

(58) Field of Classification Search ............. 370/335
See application file for complete search history.

(56) References Cited

U.S. PATENT DOCUMENTS

| | | | |
|---|---|---|---|
| 2003/0194029 A1* | 10/2003 | Heinonen et al. | 375/345 |
| 2005/0041574 A1* | 2/2005 | Wu et al. | 370/208 |
| 2005/0063345 A1* | 3/2005 | Wu et al. | 370/335 |
| 2005/0249177 A1* | 11/2005 | Huo et al. | 370/342 |
| 2005/0276238 A1* | 12/2005 | Dabak et al. | 370/312 |
| 2007/0004465 A1* | 1/2007 | Papasakellariou et al. | 455/571 |

* cited by examiner

*Primary Examiner* — Patrick Edouard
*Assistant Examiner* — Huy Ho

(57) ABSTRACT

A wireless communication system is disclosed comprising a communications network; and a plurality of base transceiver stations (BTS) coupled to the communications network. At one of the BTS is adapted to send traffic data modulated onto orthogonal frequency division multiplexing (OFDM) tones to mobile units, and send control data modulated onto code division multiplexing (CDM) codes to the mobile units. The BTS may be further adapted to send pilot data modulated onto OFDM tones to the mobile units. The transmission of the data may be compatible with HSDPA and/or IP Wireless protocols. Because the modulation scheme for the traffic data is OFDM instead of CDM, higher throughputs may be achieved in an HSDPA and/or IP Wireless-based wireless communication systems.

10 Claims, 4 Drawing Sheets

SYSTEM AND METHOD FOR TRANSMITTING INFORMATION VIA HYBRID CDM/OFDM MODES IN HSDPA AND IP WIRELESS

FIELD OF THE INVENTION

This invention relates generally to wireless communication systems, and in particular, to a system and method for transmitting information via hybrid code division multiplexing (CDM) and orthogonal frequency division multiplexing (OFDM) in High Speed Downlink Packet Access (HSDPA) and IP Wireless based systems.

BACKGROUND OF THE INVENTION

Wireless communication systems have been extremely popular for more than a decade. They allow users to communicate with each other while remaining geographically mobile. In addition, these systems allow communications to be in different modes, such as full-duplex voice, half-duplex voice, and data, as examples. These systems also employ a plurality of base transceiver stations (BTS) to wirelessly transmit and receive information to and from mobile units (MU).

Early wireless communication systems, such as Global System for Mobile Communications (GSM) based systems, were designed primarily for the communication of speech and small text messaging. As wireless customers increased their use of wireless communication systems, they demanded more services and faster transmission speeds. In response to these demands, subsequent wireless communication systems, such as Global Packet Radio Service (GPRS) and Enhanced Data rates for GSM Evolution (EDGE) based systems, were developed to provide higher data rates that allow other types of wireless services, such as multimedia messaging. These systems are based on time division multiple access (TDMA) modulation scheme.

Continuing the trend for higher data rates to provide higher speed services, other modulation schemes were developed to achieve improved data rates. For example, wireless communication systems that use code division multiplexing (CDM) modulation scheme, such as Wideband CDMA based systems, were developed to attain higher data transmission speeds. In addition, data speed enhancements to WCDMA based systems have also been made with the introduction of High-Speed Downlink Packet Access (HSDPA) and IP Wireless.

For example, an HSDPA-based wireless communication system may be able to offer a peak data rate up to about 10 mega bits per second (Mbps). In the forward link, data are sent to mobile units (MU) via 10 milliseconds frames. Each WCDMA frame consists of five HSDPA transmit time intervals (TTIs), each having a width of two (2) milliseconds. Data are also sent to mobile units (MU) using code division multiplexing (CDM) modulation, and in particular, using 16 codes, also known as orthogonal variable spreading factor (OVSF). One of the 16 OVSF codes is generally reserved for control and pilot channels for synchronization and channel estimation. Accordingly, there are typically 15 OVSF codes reserved for transmitting traffic data to mobile units (MU). The IP Wireless protocol similarly uses OVSF for transmitting traffic data to mobiles.

One drawback of the HSDPA and IP Wireless data transmitting scheme is that it uses CDM modulation scheme. CDM modulation is generally susceptible to intra-cell interference due to the fact that the orthogonality of the OSVF codes degrades when they are transmitted over the air. This has a tendency to lower the achievable data rates of the HSDPA and IP Wireless based system.

SUMMARY OF THE INVENTION

An aspect of the invention relates to a wireless communication system, comprising a communications network; and a plurality of base transceiver stations (BTS) coupled to the communications network. At least one of the base transceiver stations (BTS) is adapted to send traffic data modulated onto orthogonal frequency division multiplexing (OFDM) tones to a plurality of mobile units (MU), and send control data modulated onto code division multiplexing (CDM) codes to the plurality of mobile units (MU). Because the modulation scheme for the traffic data is OFDM instead of CDM, higher throughputs may be achieved in HSDPA and/or IP Wireless-based wireless communication systems. The base transceiver station (BTS) may be further adapted to send pilot data modulated onto OFDM tones to the plurality of mobile units (MU) for channel characterization purposes.

Another aspect of the invention relates to a base transceiver station (BTS), comprising an orthogonal frequency division multiplexing (OFDM) modulator to modulate traffic data or symbols onto OFDM tones; a code division multiplexing (CDM) modulator to modulate control data or symbol onto one or more CDM codes; a radio frequency (RF) modulator to modulate the OFDM tones and the one or more CDM codes onto an RF carrier; and an antenna to wirelessly transmit the modulated RF carrier to mobile units (MU). The OFDM modulator may be further adapted to modulate pilot data or symbol onto one or more OFDM tones. These pilot data may be used by mobile units (MU) for channel estimation.

Other aspects, features, and techniques of the invention will be apparent to one skilled in the relevant art in view of the following detailed description of the invention.

DETAILED DESCRIPTION OF THE EXEMPLARY EMBODIMENTS

Figure 1:
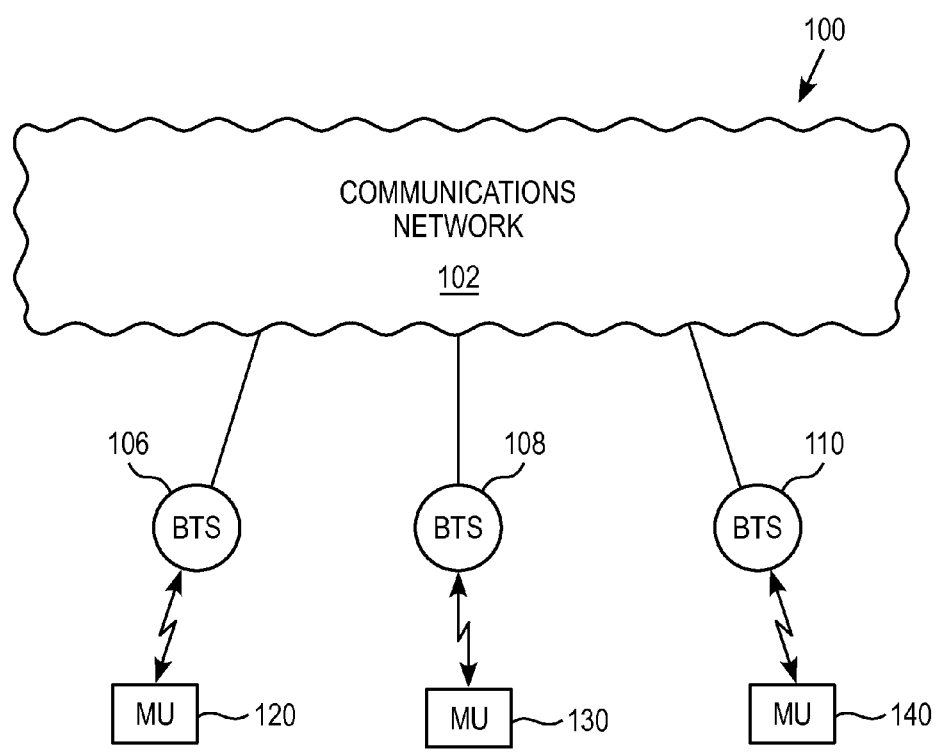
FIG. 1 illustrates a block diagram of an exemplary wireless communication system in accordance with an embodiment of the invention.

FIG. 1 illustrates a block diagram of an exemplary wireless communication system 100 in accordance with an embodiment of the invention. As discussed in more detail below, the wireless communication system 100 comprises one or more base transceiver stations (BTS) capable of wirelessly transmitting traffic and (channel estimation) pilot data to one or more mobile units (MU) using orthogonal frequency division multiplexing (OFDM) modulation scheme, and control and (synchronization) pilot data to one or more mobile units (MU) using code division multiplexing (CDM) modulation scheme. The transmission of these data may be in accordance with the transmission burst frame requirements of the High-Speed Downlink Packet Access (HSDPA) and IP Wireless protocols. As compared to the CDM traffic data transmission modulation scheme specified in the current HSDPA and the IP Wireless protocols, the OFDM modulation scheme could provide a 50 to 200 percent improvement in data transmission throughput.

In particular, the wireless communication system 100 comprises a communications network 102 and a plurality of base transceiver stations (BTS) 106, 108, and 110 coupled to the communications network 102. The wireless communication system 100 provides wireless communication services to a plurality of mobile units (MU), such as mobile units (MU) 120, 130, and 140. In this example, mobile unit (MU) 120 is assigned to communicate with base transceiver station (BTS) 106, mobile unit (MU) 130 is assigned to communicate with base transceiver station (BTS) 108, and mobile unit (MU) 140 is assigned to communicate with base transceiver station (BTS) 110.

The communications network 102, in turn, comprises one or more network devices adapted to provide specific communication services to one or more mobile units (MU). For example, the one or more network devices may provide diverse communication services, such as full-duplex voice, half-duplex voice, data and/or other types of communications. The communications network 102 may be based on any type of technology and/or protocol, such as Internet Protocol (IP), Asynchronous Transfer Mode (ATM), frame relay, proprietary protocol, any combination thereof, and others.

Figure 2A:
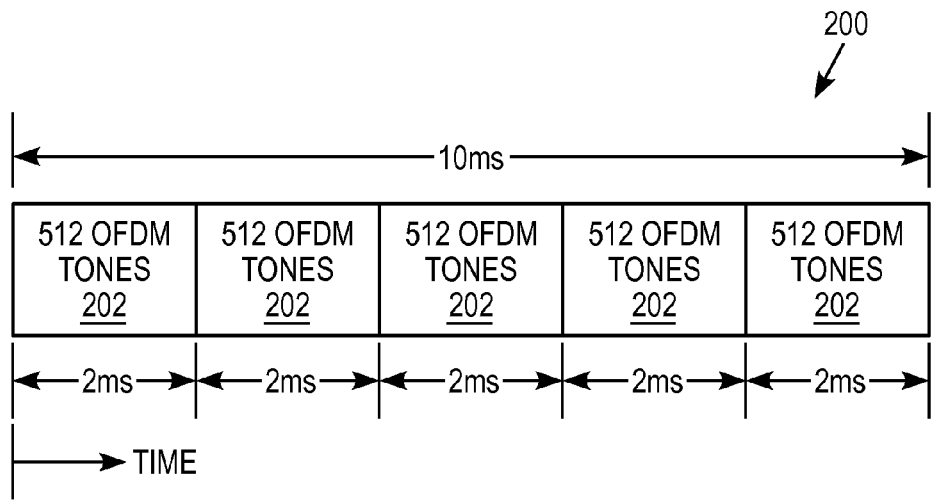
FIG. 2A illustrates a diagram of an exemplary transmission frame in accordance with another embodiment of the invention.

FIG. 2A illustrates a diagram of an exemplary transmission frame 200 in accordance with another embodiment of the invention. The transmission frame 200 is a particular example of a transmission frame sent by at least one of the base transceiver stations (BTS) 106, 108, and 110 to one or more mobile units (MU) 120, 130, and 140, respectively. In this example, the transmission frame 200 is similar to the transmission frame of the HSDPA protocol. It shall be understood that the transmission frame 200 may be structured differently than the HSDPA transmission frame.

In particular, the transmission frame 200 has a length of approximately 10 milliseconds (ms). The frame 200 comprises a plurality of transmit time intervals (TTIs) 202. Each TTI 202 has a length of approximate two (2) milliseconds (ms). In each TTI 202, a plurality of OFDM tones may be used to send traffic data and pilot data to mobile units (MU). In this example, the pilot data may be used for channel characterization by mobile units (MU). In this example, a predetermined number of 512 OFDM tones are used to send data to mobile units (MU). It shall be understood that any number of OFDM tones may be used to send data to mobile units (MU).

In addition, parallel to the transmission frame 200, there are two channels transmitted to carry control and pilot data to mobile units (MU). In this case, the transmission of the pilot data may be for synchronization purposes. In addition, the transmission of the control and pilot uses a CDM modulation scheme. This is for the purpose of providing backward compatibility with the current HSDPA protocol.

Taking the HSDPA protocol example, which specifies an operating frequency range of approximately 3.84 MHz, each of the 512 OFDM tones would have a bandwidth of approximately 7.5 KHz (3.84 MHz/512 tones). In addition, each OFDM tone may be configured to send approximately 15 data chips per each TTI 202. Thus, the total number of data chips that may be sent per a TTI 202 is approximately 7680. One of more of the OFDM tones may be assigned to send pilot data to a particular mobile unit (MU). As discussed below, a plurality of OFDM tones may be assigned to send pilot data to mobile units (MU) to provide improved channel characterization by mobile units (MU).

Figure 2B:
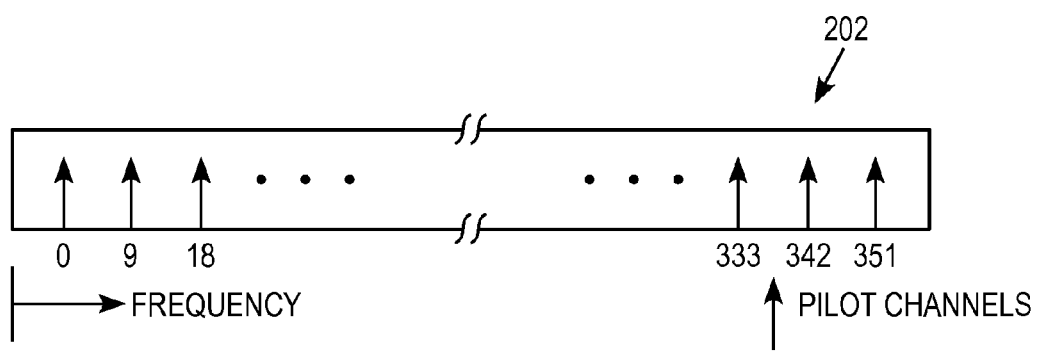
FIG. 2B illustrates an exemplary transmit time interval (TTI) in accordance with another embodiment of the invention.

FIG. 2B illustrates an exemplary TTI 202 in accordance with another embodiment of the invention. As discussed above, the exemplary TTI 202 includes 512 tones (tones 0-511) for sending information to mobile units (MU). Such information may include traffic data and pilot data. In this example, the TTI 202 includes a plurality of OFDM tones assigned to send pilot information to mobile units (MU). The pilot channel may be assigned to OFDM tones that interspersed throughout the operating bandwidth. For example, the pilot channel may be assigned to every ninth OFDM tone (e.g., OFDM tones 0, 9, 18, etc.). Such interspersed pilot channels allow mobile units (MU) to better characterized their respective RF environments because the assigned pilot channel may be close in frequency to the assigned traffic channel(s) for the respective mobile units (MU).

For example, the base transceiver station (BTS) 106 may have assigned OFDM tones 10-12 to mobile unit (MU) 120 for receiving traffic data from the communications network 102. In order for mobile unit (MU) 120 to better characterize its RF channel, the base transceiver station (BTS) 106 also has assigned OFDM tone 9 to the mobile unit (MU) 120 for receiving pilot information. Since OFDM tone 9 is close in frequency to assigned traffic channel OFDM tones 10-12, the pilot information allows the mobile unit (MU) 120 to more accurately characterize its RF environment. In addition, since the bandwidth of the OFDM tones is relatively small, the variation of the RF environment across the received channels (OFDM tones 9-12) is likely to be relatively small; thereby reducing errors associated with RF environment variations between the assigned pilot channel and the assigned traffic channel(s). Alternatively, the mobile unit (MU) 120 may select one or more of the pilot OFDM channels instead of the base transceiver station (BTS) 120 assigning a pilot channel for the mobile unit (MU) 120.

Figure 3A:
FIG. 3A illustrates an exemplary transmission frame in accordance with another embodiment of the invention.

FIG. 3A illustrates a diagram of another exemplary transmission frame 300 in accordance with another embodiment of the invention. As in the above example, the transmission frame 300 is a particular example of a transmission frame sent by at least one of the base transceiver stations (BTS) 106, 108, and 110 to one or more mobile units (MU) 120, 130, and 140, respectively. In this example, the transmission frame is similar to the transmission frame of the IP Wireless protocol. It shall be understood that the transmission frame 300 may be structured differently than the IP Wireless transmission frame.

Figure 3B:
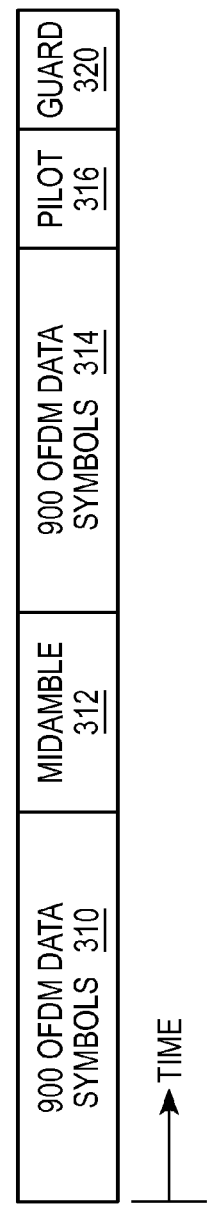
FIG. 3B illustrates an exemplary time interval (TTI) in accordance with another embodiment of the invention.

In particular, the transmission frame 300 has a length of approximately 10 milliseconds (ms). The frame 300 comprises a plurality of TTIs 302. Each TTI 302 has a length of approximate 0.667 microsecond. As shown in FIG. 3B, each TTI 302 comprises a first data transmission burst 310, a midamble 312, a second data transmission burst 314, a pilot burst 316, and a guard period 320. The first and second transmission bursts 310 and 314 are used to send traffic and pilot data to mobile units (MU) using a plurality of OFDM tones. The pilot data sent during the first and second data transmission bursts may be used by mobile units (MU) for channel characterization purposes. The pilot data sent during the pilot burst 316 may be used by mobile units (MU) for synchronization purposes. In this example, a predetermined number of 900 OFDM tones are used to send data to mobile units (MU). It shall be understood that any number of OFDM tones may be used to send data to mobile units (MU).

In addition, the first and second transmission bursts 310 may each comprise a channel for transmitting control data to mobile units (MU). In addition, the transmission of the control data uses a CDM modulation scheme. This is for the purpose of providing backward compatibility for the current IP Wireless protocol.

Figure 3C:
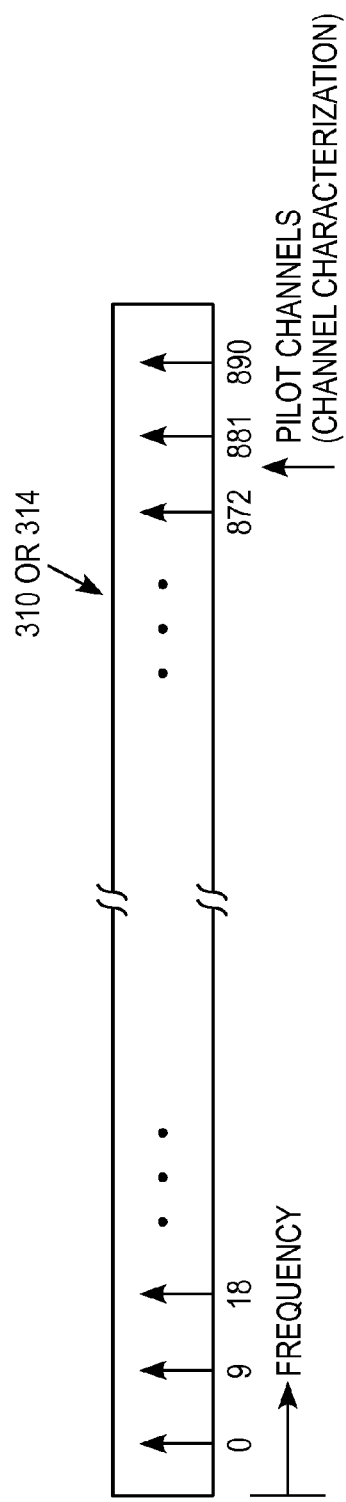
FIG. 3C illustrates an exemplary data transmission burst in accordance with another embodiment of the invention.

FIG. 3C illustrates an exemplary data transmission burst 310 and/or 314 in accordance with another embodiment of the invention. As discussed above, the exemplary data transmission burst 310 and/or 314 includes 900 tones (tones 0-899) for sending information to mobile units (MU). Such information may include traffic data and pilot data. The data transmission burst 310 and/or 314 also includes a control channel that uses a CDM modulation scheme to send control data to mobile units (MU). In this example, the data transmission burst 310 and/or 314 includes a plurality of OFDM tones assigned to send pilot information to mobile units (MU). The pilot channel may be assigned to OFDM tones that are interspersed throughout the operating bandwidth. For example, the pilot channel may be assigned to every ninth OFDM tone (e.g., OFDM tones 0, 9, 18, etc.). Such interspersed pilot channels allow mobile units (MU) to better characterized their respective RF environments because the assigned pilot channel may be close in frequency to the assigned traffic channel(s) for the respective mobile units (MU).

For example, the base transceiver station (BTS) 106 may have assigned OFDM tones 10-12 to mobile unit (MU) 120 for receiving traffic data from the communications network 102. In order for mobile unit (MU) 120 to better characterize its RF channel, the base transceiver station (BTS) 106 also has assigned OFDM tone 9 to the mobile unit (MU) 120 for receiving pilot information. Since OFDM tone 9 is close in frequency to assigned traffic channel OFDM tones 10-12, the pilot information allows the mobile unit (MU) 120 to more accurately characterize its RF environment. In addition, since the bandwidth of the OFDM tones is relatively small, the variation of the RF environment across the received channels (OFDM tones 9-12) is likely to be relatively small; thereby reducing errors associated with RF environment variations between the assigned pilot channel and the assigned traffic channel(s). Alternatively, the mobile unit (MU) 120 may select one of the pilot OFDM channel instead of the base transceiver station (BTS) 120 assigning a pilot channel for the mobile unit (MU) 120.

Figure 4:
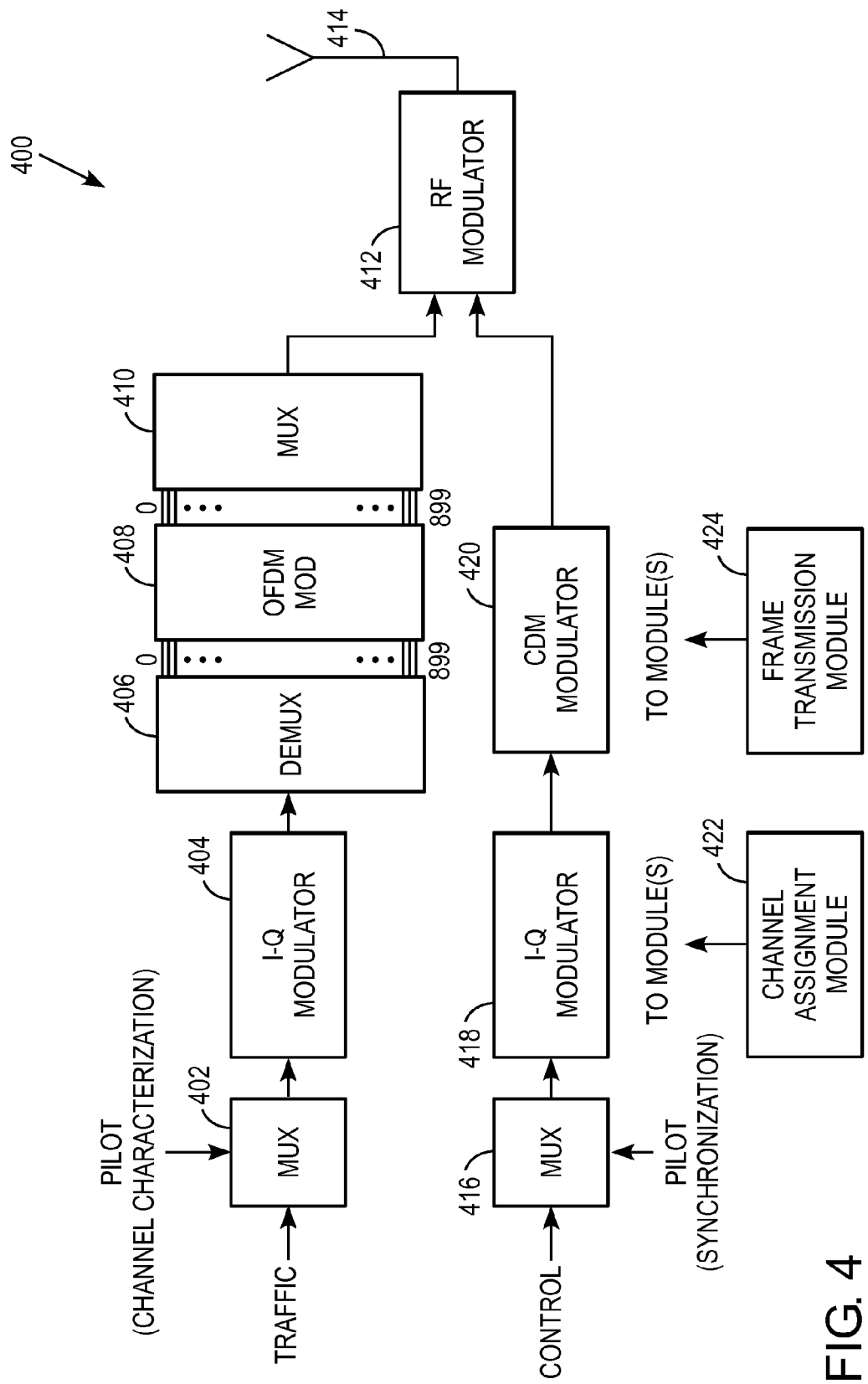
FIG. 4 illustrates a block diagram of an exemplary base transceiver station (BTS) in accordance with another embodiment of the invention.

FIG. 4 illustrates a block diagram of an exemplary base transceiver station (BTS) 300 in accordance with another embodiment of the invention. The base transceiver station (BTS) 400 may be an exemplary detailed version of any of the base transceiver stations (BTS) 106, 108, and 110 previously discussed with reference to wireless communication system 100. As discussed in more detail below, the base transceiver station (BTS) 400 is configured to deliver information to mobile units (MU) using OFDM tones and CDM codes, such as orthogonal spread variable factor (OSVF) codes. The base transceiver station (BTS) 400 may be further adapted to assign OFDM tones for sending traffic and pilot information to mobile units (MU).

In particular, the base transceiver station 400 comprises a first data multiplexer 402, a first I-Q modulator 404 (e.g., a quadrature amplitude modulator (QAM)), a demultiplexer 406, an OFDM modulator 408, a multiplexer 410, an RF modulator 412, and an antenna 414. The base transceiver station (BTS) 400 further comprises a second multiplexer 416, a second I-Q modulator 418, and a CDM modulator 420. Additionally, the base transceiver station (BTS) 400 further comprises a frame transmission control module 424 and a channel assignment module 422.

The first data multiplexer 402 multiplexes data from a couple of data sources, including traffic and pilot. In this case, the pilot data may be used by mobile units for channel characterization purposes. The first I-Q modulator 404 generates data symbols from the received multiplexed data. The demultiplexer 406 separates the data symbols into distinct channels, such as, for example, 360 channels (channels 0-359) in the case of HSDPA, and 900 channels (channels 0-899) in the case of IP Wireless. The OFDM modulator 408 applies OFDM modulation to the channels of data symbols. The multiplexer 410 multiplexes the OFDM modulated channels of data symbols. The RF modulator 412 modulates an RF carrier with the OFDM modulated channels of data symbols for wireless transmission by the antenna 414 to the mobile units (MU).

The second data multiplexer 416 multiplexes data from a couple of data sources, including control and pilot. In this case, the pilot data may be used by mobile units for synchronization purposes. The second I-Q modulator 418 generates data symbols from the received multiplexed data. The CDM modulator 420 applies CDM modulation to the channels of data symbols to generate symbols modulated onto one or more OSVF codes. The RF modulator 412 modulates an RF carrier with the CDM modulated channels of data symbols for wireless transmission by the antenna 414 to the mobile units (MU).

The frame transmission control module 424 controls the transmission of the frames to the mobile units (MU) in accordance with the HSDPA and/or IP Wireless protocols, or in other formats. Additionally, the channel assignment module 422 assigns traffic channels, and may assign pilot channels, to mobile units (MU), as previously discussed.

In summary, because the modulation scheme is OFDM instead of CDM, additional benefits may be achieved in an HSDPA and IP Wireless-based wireless communication system, or other wireless communication system. For instance, the OFDM modulation scheme is generally less susceptible to intra-cell interference than the CDMA modulation scheme. Thus, higher data throughput, such as 50 to 200 percent higher, may be achieved. In addition, with OFDM modulation, a plurality of pilot channels may be interspersed across the operating frequency bands to allow better channel characterization of mobile units (MU) close in frequency to assigned traffic channels. This may further increase the data throughput of the wireless communication system. It shall be understood that instead of the pilot channels being interspersed across the operating frequency band, the pilot channels may also be lumped together, such as in OFDM 0-39 or 0-19 and 340-359, for example.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A base transceiver station (BTS), comprising:
 an orthogonal frequency division multiplexing (OFDM) modulator to modulate traffic data or symbols onto OFDM tones and pilot data or symbol onto one or more OFDM tones that are interspersed among said traffic modulated OFDM tones, wherein frequency spacing between adjacent pilot modulated OFDM tones, respectively, are substantially the same, and the plurality of said traffic modulated OFDM tones are situated between adjacent pilot modulated OFDM tones;

a code division multiplexing (CDM) modulator to modulate control data or symbol onto one or more CDM codes;

a radio frequency (RF) modulator to modulate said modulated OFDM tones and said one or more modulated CDM codes onto an RF carrier; and an antenna to wirelessly transmit said modulated RF carrier to mobile units (MU); and a channel assignment module adapted to assign one or more traffic channels to at least one of said mobile units (MU) and assign one or more pilot channels to said at least one of said mobile units (MU), wherein one of the traffic channels assigned to the at least one of said mobile units (MU) includes a plurality of traffic modulated OFDM tones next to each other and one of the plurality of tones is next to one of the pilot channels assigned to the at least one of said mobile units (MU).

2. The base transceiver station (BTS) of claim 1, further comprising a frame transmission control module adapted to control the sending of said traffic and control data to said mobile units (MU) in separate frames.

3. The base transceiver station (BTS) of claim 2, wherein said frame transmission control module is further adapted to control the sending of said traffic and control data to said mobile units (MU) in separate TTIs within each frame.

4. The base transceiver station of claim 3, wherein lengths of said frame and TTIs are compliant with a High-Speed Downlink Packet Access (HSDPA) protocol.

5. The base transceiver station (BTS) of claim 3, wherein lengths of said frame and TTIs are compliant with an IP Wireless protocol.

6. A method for a base transceiver station (BTS), comprising:

modulating traffic data or symbols onto OFDM tones;

modulating pilot data or symbol onto one or more OFDM tones that are interspersed among said traffic modulated OFDM tones, wherein frequency spacing between adjacent pilot modulated OFDM tones, respectively, are substantially the same, and the plurality of said traffic modulated OFDM tones are situated between adjacent pilot modulated OFDM tones;

modulating control data or symbol onto one or more code division multiplexing (CDM) codes;

modulating, by a radio frequency (RF) modulator, said modulated OFDM tones and said one or more modulated CDM codes onto an RF carrier; and wirelessly transmitting said modulated RF carrier to mobile units (MU), wherein one or more traffic channels are assigned to at least one of said mobile units (MU) and one or more pilot channels are assigned to said at least one of said mobile units (MU), wherein one of the traffic channels assigned to the at least one of said mobile units (MU) includes a plurality of traffic modulated OFDM tones next to each other and one of the plurality of tones is next is to one of the pilot channels assigned to the at least one of said mobile units (MU).

7. The method of claim 6, comprising:

controlling the sending of said traffic and control data to said mobile units (MU) in separate frames.

8. The method of claim 7, wherein the sending of said traffic and control data to said mobile units (MU) is controlled to be in separate TTIs within each frame.

9. The method of claim 8, wherein lengths of said frame and TTIs are compliant with a High-Speed Downlink Packet Access (HSDPA) protocol.

10. The method of claim 8, wherein lengths of said frame and TTIs are compliant with an IP Wireless protocol.

* * * * *